Inventors:
Henry A. Ferguson
Ralph C. Boyle

Nov. 15, 1955 — H. A. FERGUSON ET AL — 2,723,569
CHANGE-SPEED TRANSMISSION CONTROLS
Original Filed March 27, 1953 — 4 Sheets-Sheet 2
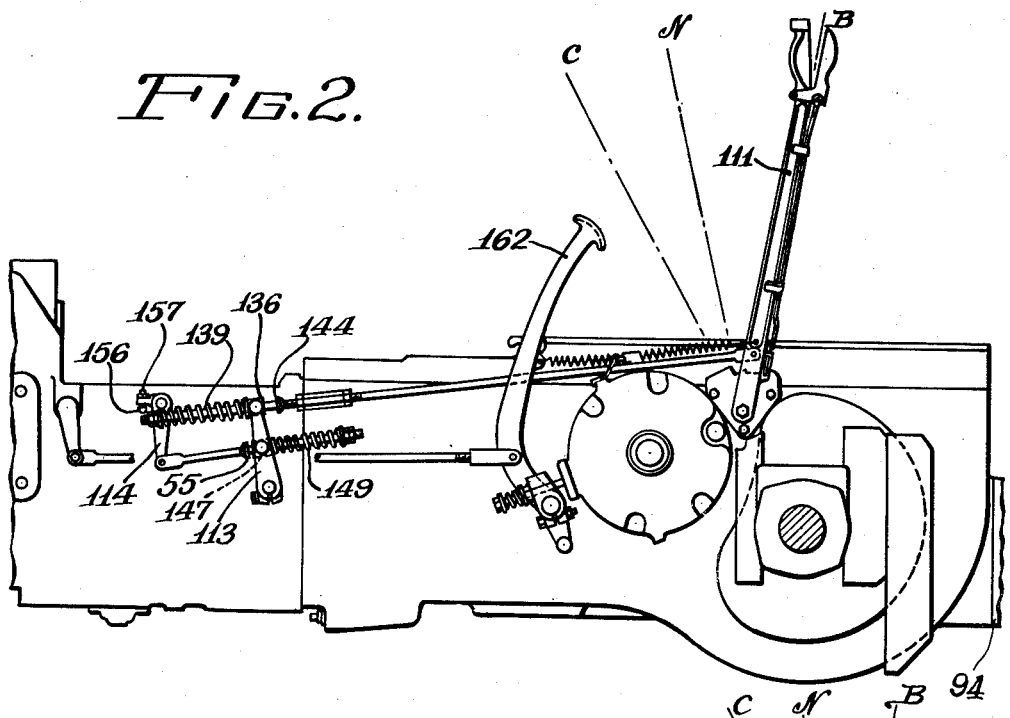
FIG.2.
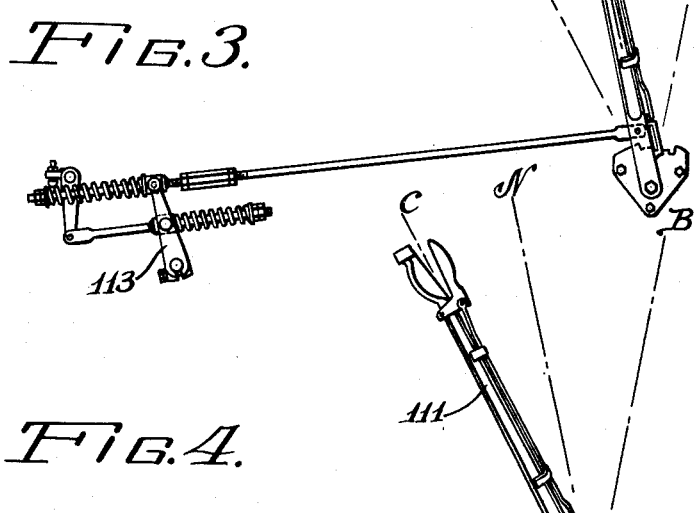
FIG.3.
FIG.4.
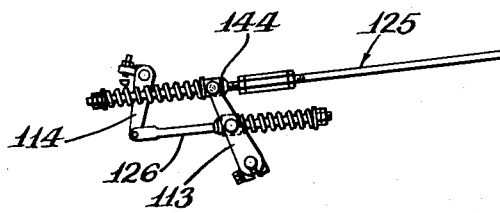
Inventors:
Henry A. Ferguson
Ralph C. Boyle

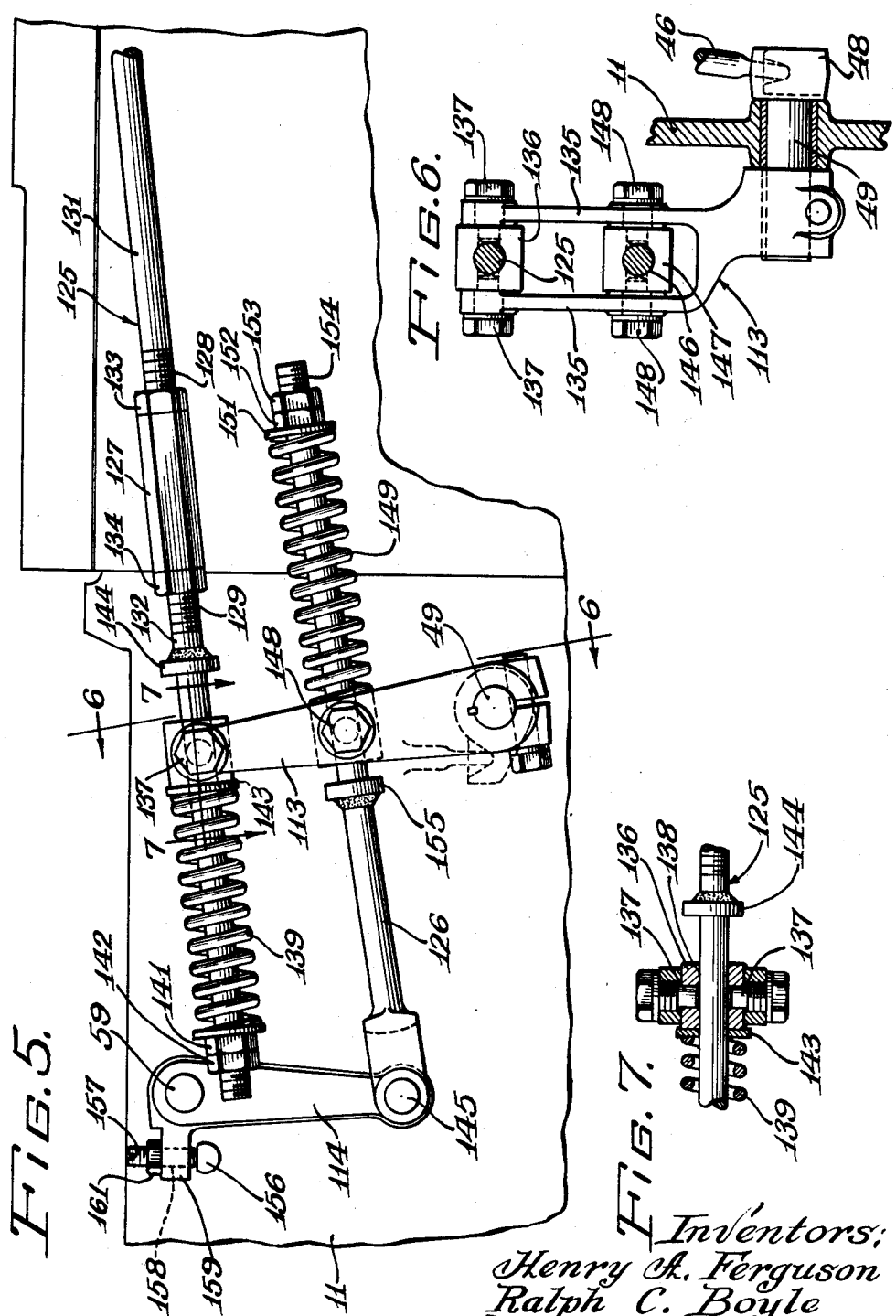

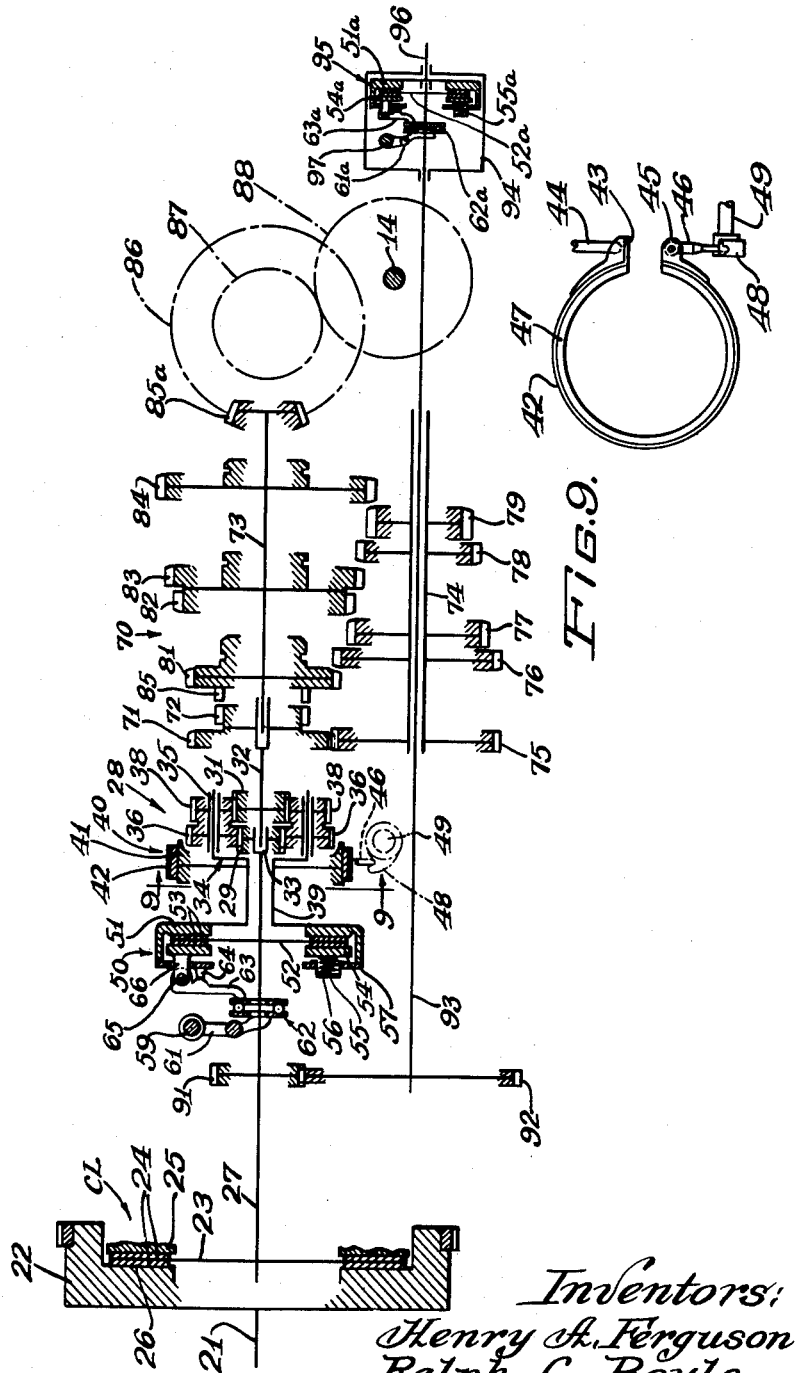

United States Patent Office 2,723,569
Patented Nov. 15, 1955

2,723,569

CHANGE-SPEED TRANSMISSION CONTROLS

Henry A. Ferguson, Lombard, and Ralph C. Boyle, Chicago, Ill., assignors to International Harvester Company, a corporation of New Jersey Original application March 27, 1953, Serial No. 345,121. Divided and this application August 3, 1954, Serial No. 447,498

2 Claims. (Cl. 74—473)

This invention relates to change-speed transmissions for vehicles such as tractors, and more particularly concerns controls therefor.

This application is a division of our prior application, Serial No. 345,121, filed March 27, 1953, for Power Transmission and Power Take-Off Mechanism for Tractors, wherein there is shown and claimed subject matter also disclosed but not claimed in this application, constituting a plural speed planetary gearing power transmission unit interposed between the vehicle engine and the tractive propelling units thereof that can be engaged under load into either of different speeds from a neutral status in which no power is transmitted through the unit to the propelling means, together with a power take-off train driven from the engine from a position ahead of the planetary gearing unit and having a power train connecting means therein engageable or disengageable under load whereby an independent power take-off is provided utilizing the inherent power train interrupting feature of the planetary gearing unit. Also disclosed and claimed in said parent application, Serial No. 345,121, is the arrangement wherein the planetary gearing power transmission unit serves as a torque amplifier unit interposed between the engine and a change-speed gearing unit for driving the vehicle-propelling means.

The primary object of this invention is the provision of a novel control linkage manually operable for selectively placing the planetary gearing unit of the aforesaid development in the neutral status or in condition for establishing either of the power trains in power-transmitting relation.

The above and other desirable objects inherent in and encompassed by the invention are further elucidated in the ensuing description, the appended claims, and the annexed drawings, wherein:

Fig. 1 is a side-elevational view of a farm tractor having a traction wheel nearest the observer removed to expose parts of a control linkage constituting a preferred embodiment of this invention, for controlling parts of change-speed transmission mechanism contained within the tubular longitudinal body of the vehicle;

Figure 2 is an enlarged fragmentary view showing the body of the tractor in side elevation, and illustrating the control linkage with parts thereof in the respective positions assumed while a manually operable control lever thereof is in the rearmost (rightward) position for establishing the lowest speed connection of two possible speed connections through a torque amplifier mechanism constituting the species of change-speed gearing contained within the body of the tractor;

Fig. 3 is a fragmentary view of the linkage of Figs. 1 and 2 but with the manually operated control lever in the neutral position wherein neither of the power trains of the torque amplifier is in operation;

Fig. 4 is a view similar to Fig. 3 but showing the manually controlled lever in its forwardmost position, causing establishment of the highest of the two speed connections through the torque amplifier.

Fig. 5 is an enlarged fragmentary view of the control linkage showing details of certain parts while in the position illustrated in Fig. 2;

Fig. 6 is a fragmentary sectional view taken on the line 6—6 of Fig. 5;

Fig. 7 is a fragmentary sectional view taken on the line 7—7 of Fig. 5;

Figure 1:
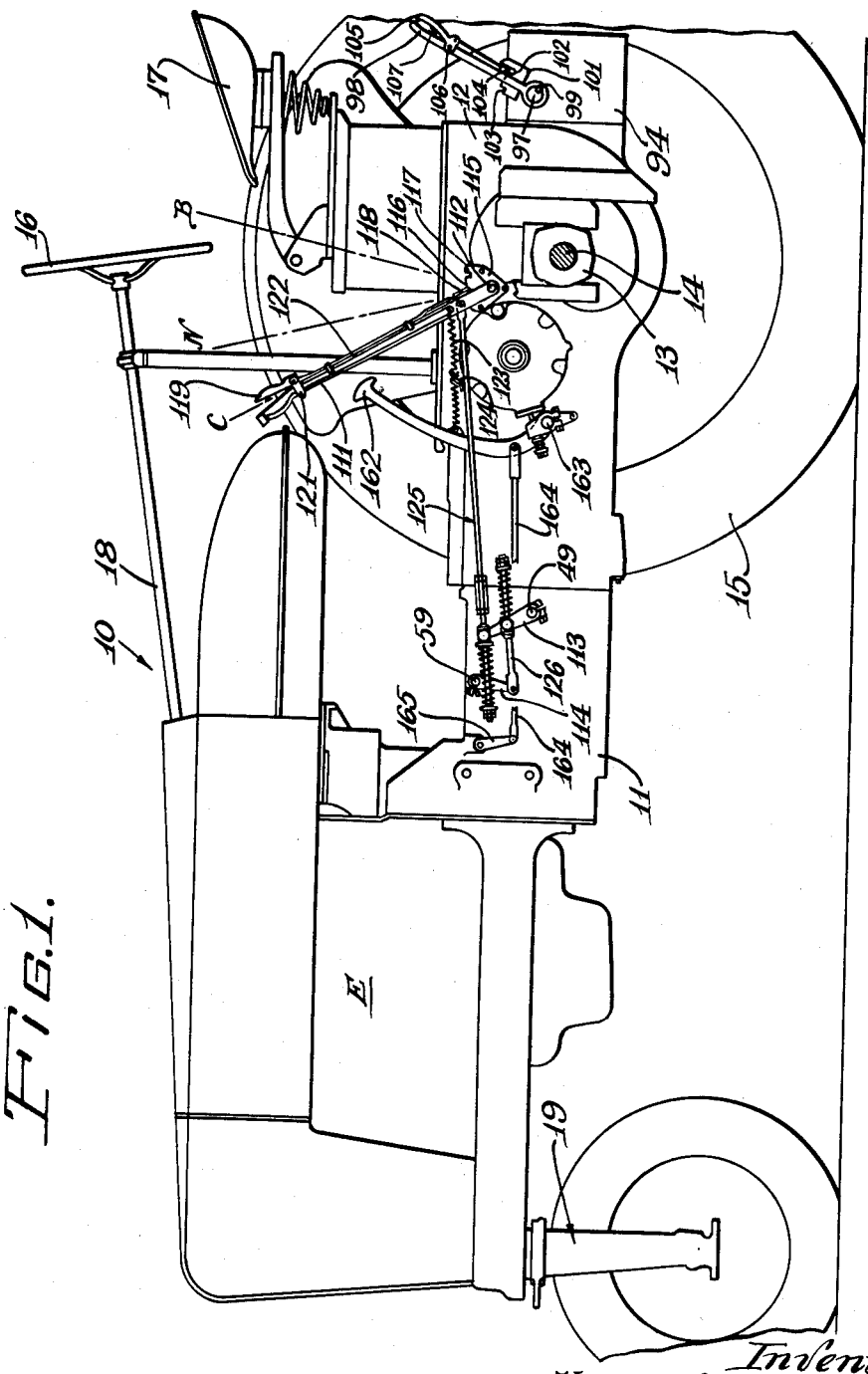

Fig. 8 is a diagrammatic view illustrating parts of the power-transmitting mechanism housed within the tractor body, they being a torque amplifier in the form of a planetary gearing power transmission unit interposed between an engine crankshaft and a typical change-speed transmission unit for transmitting power from the engine to the driving axles for vehicle-propelling means, and a power take-off connection driven from the engine crankshaft at a point in the power transmission train ahead of the torque amplifier unit; and Fig. 9 is an axial view taken on the line 9—9 of Fig. 8, illustrating a type of brake band employed in a friction device on the torque amplifier unit.

The invention is illustrated in connection with a farm tractor 10, Fig. 1, of the tricycle species. This tractor has an engine E adjacent the left or front end thereof and connected through a tubular body 11 with a differential casing 12 from which rear traction axle housings 13 (one being shown) project oppositely and transversely of the tractor body for containing respective axles 14 with which respective traction wheels 15 are constrained for rotation. A steering wheel 16 accessible from a driver's seat 17 is operable through a steering shaft 18 and other driving connections, not shown, for rotating a steering truck 19 about a vertical axis to steer the vehicle.

A driving train through which the traction wheels 15 are connected with the engine E, as well as a power take-off train, are contained within the tractor body 11 and the differential casing 12 and are shown diagrammatically in Fig. 8 to which attention is now invited.

The rear end of the engine crankshaft is shown diagrammatically at 21 in the left-hand portion of Fig. 8. A flywheel 22 is constrained for rotation with the crankshaft and has asssembled therewith a main clutch CL of the vehicle. Clutch CL comprises a driven disk 23 with annular friction facings 24 releasably gripped between an annular pressure plate 25 and an annular face 26 of the flywheel. A clutch-driven shaft 27 is constrained for rotation with the driven element 23 coaxially with the crankshaft 21.

A plural speed planetary gearing power transmission unit 28, also herein referred to as a torque amplifier unit, comprises a driving element in the form of a sun gear 29 formed integrally with the rear end of the clutch-driven shaft 27, and a coaxial driven element in the form of a sun gear 31 constrained for rotation with a transmission drive shaft 32. The forward end of the shaft 32 is piloted at 33 in the rear end of the shaft 27. A planet gearing carrier 34 comprises a plurality of planet gear journalled shafts 35 spaced circumferentially of the sun gears 29 and 31, and each shaft having journalled thereon a planet gear cluster 36—38. Gears 36 of these clusters mesh with the sun gear 29, whereas gears 38 thereof mesh with the sun gear 31. A forward sleeve extension 39 of the carrier 34 has a brake drum 41 constrained for rotation therewith and this brake drum together with the carrier is adapted to be selectively constrained against rotation by a brake band 42 having one end 43 braced against the tractor body by a strut 44, and having an opposite end 45 movable toward the end 43 by force received through a strut 46 to forcibly contract a friction liner 47 of the brake band frictionally into engagement with the cylindrical periphery of the brake drum 41; see Fig. 9. The drum 41 and band 42 are parts of a friction device 40 operable to selectively connect the planetary gearing carrier 34 with the tractor body 11 to prevent rotation of such carrier or disconnect the carrier from such body to permit rotation thereof relatively to the tractor body. The resilient band 42 while contracted is integrally stressed in a manner biasing it toward an expanded condition frictionally released from the drum 41; that is, the brake band is biased toward a brake-release condition. This character of the band is overcome by manual force applied upwardly through the lower end of the strut 46 by a lever 48 which is constrained for rotation with a rockable shaft 49 when this shaft is rocked clockwise, as viewed in Fig. 8. Operating linkage for controlling rocking of the shaft 49, illustrated in Figs. 2 through 7, will be presently described.

Also constrained for rotation with the forward sleeve extension 39 of the planetary gearing carrier 34 is a reactor plate 51 of a friction device 50 operable to selectively interconnect the planetary gearing carrier 34 and the sun gear 29 or release these parts 34 and 29 to permit their relative rotation. A driving disk 52 of the clutch 50 has annular friction facings 53 thereof normally gripped frictionally between an annular pressure plate 54 and the reactor plate 51. Compression springs 55 (one being shown) react between the forward or left end of the pressure plate 54 and spring cups 56 therefor held within a clutch-cover plate 57 which is constrained for rotation with the reactor plate 51. The springs 55 are compressible by forward endwise movement of the pressure plate 54, pursuant to disengaging the clutch 50, by means of manual force applied through a rock shaft 59, a shifter fork 61 for rocking with the shaft 59, a throw-out bearing unit 62 movable axially rearwardly concentrically about the shaft 27 to pivot throw-out levers 63 (one being shown) counterclockwise upon fulcrum member 64, whereby pivotal connections 65 between outer ends of these levers and lugs 66 upon the forward end of the pressure plate 54 are effective for moving the pressure plate forwardly for releasing the clutch.

When the clutch-friction device 50 is engaged and the brake-friction device 40 is disengaged, the sun gear 29 and the planetary gearing carrier 34 will be held against relative rotation, thereby "locking up" the planetary gearing unit 28 and causing the transmission drive shaft 32 to rotate in unison with the clutch-driven shaft 27. When the clutch-friction device 50 is disengaged and the brake-friction device 40 is engaged, the carrier 34 will be held fixed with respect to the tractor body 11 wherefore the gears 36 and 38 are free to rotate about the fixed bearing shafts 35 therefor and power will be transmitted from the shaft 27 through the driving element or sun gear 29, planetary gears 36, planetary gears 38, and driven element or sun gear 31 to the transmission drive shaft 32 at a reduced speed with respect to the shaft 27. The shaft 32 will also be capable of transmitting greater torque because of the leverage advantage gained through the gears 29, 36, 38, and 31.

When neither of the friction devices 40 nor 50 is engaged, the rotating driving element 29 of the planetary gearing unit will cause rotation of the gears 36 and 38 about their individual axes wherefor because of resistance to rotation offered by the driven element or sun gear 31 of this unit, the gears 30 will roll around the periphery of the gear 31 and revolve the carrier 34 about the common axis of the sun gears 29 and 31 without rotation being imparted to the gear 31 and the shaft 32. Thus a neutral or power disconnection condition will prevail between the shafts 27 and 32.

A main change-speed power transmission unit 70 comprises a gear 71 constrained for rotation with the rear end of the transmission drive shaft 32, a jaw clutch counterpart 72 formed integrally with the gear 71, a transmission main shaft 73 together with parts mounted thereon, and a tubular transmission countershaft 74 and parts mounted thereon. Gears 75, 76, 77, 78, and 79 are constrained for rotation with the tubular countershaft 74. A gear 81, a gear cluster comprising gears 82 and 83 and a gear 84 are all constrained for rotation with the transmission main shaft 73 but are slidable axially thereon. A jaw clutch component 85 on the gear 81 is meshable with the jaw clutch component 72 for causing the shaft 73 to rotate with the transmission drive shaft 32 when the gear 81 is slid forwardly from the neutral position illustrated therefor. Gear 81 may be slid rearwardly for meshing with the countershaft gear 76 to establish a fourth speed connection; the gear cluster 82—83 may be slid forwardly to mesh gear 82 with gear 77 to establish a third speed connection; the gear cluster 82—83 may be slid rearwardly to mesh gears 83 and 78 to establish a second speed connection; or the gear 84 may be slide forwardly to mesh with gear 79 to establish a first speed connection.

Power is transmitted from the transmission main shaft 73 through a beveled pinion 85a to a differential unit 86 which differentially drives gears 87 which respectively mesh with and drive gears 88 which are respectively constrained for rotation with the vehicle axle shafts 14.

An auxiliary power take-off driving train includes an engine-driven driving element in the form of a gear 91 disposed between the clutch CL and the planetary gearing unit 28, where this gear 91 is constrained for rotation coaxially with the clutch-driven shaft 27 and also with the engine crankshaft 21 while the main clutch CL is engaged. Gear 91 meshes with and drives a gear 92 constrained for rotation with a power take-off shaft 93 extending coaxially through the tubular countershaft 74. This power take-off shaft extends into a connecting unit casing 94 upon the back wall of the differential casing 12 where a friction device in the form of a clutch 95 is operable for selectively connecting or disconnecting the shaft 93 with a tail shaft 96. The clutch 95 is essentially the same as the clutch 50 wherefor, to avoid duplication of description, the parts of the clutch 95 are simply designated by the same respective reference numerals as corresponding elements in the clutch 50 with the addition of a sub "a." The shifter fork 61a for controlling engagement of the clutch 95 is rockable by and with a shaft 97 journalled in a side wall of the casing 94. A hand lever 98, Fig. 1, is keyed at 99 to the outer end of the shaft 97. Associated with the lever is a quadrant 101 having a rearward notch 102 and a forward notch 103. When the lever 98 is in a rearwardly rocked position, illustrated in Fig. 1, so that a latch member 104 thereon is engaged in the notch 102, the shifter fork 61a, Fig. 8, will be retracted from the throw-out bearing 62a and the clutch 95 will be allowed to remain engaged by virtue of the springs 55a. By gripping a handle 105 of the lever 98 and pivoting this handle about a pivot 106, the latch 104 can be lifted from the notch 102 and the lever pivoted counterclockwise where the handle 105 can be released for allowing the latch 104 to drop into the notch 103 under the force of a spring 107. In this counterclockwise pivoted position of the lever 98 the shifter fork 61a will have been pivoted counterclockwise for moving the throw-out bearing 62a rearward and pivoting the throw-out levers 63a counterclockwise for disengaging the clutch 95.

A control linkage for the plural speed planetary gearing power transmission gearing 28 is illustrated in Figs. 1 through 7. This linkage extends between a manually operable lever 111 pivoted at 112 to the tractor, and first and second arms 113 and 114 which are respectively upon the outer ends of the control shaft 49 for the brake or speed-control device 40, and the shaft 59 for the clutch or speed-control device 50. Lever 111 is operable along a quadrant 115 having notches 116 and 117 adapted to alternately receive a latch member 118 controlled by a handle 119 pivoting to the lever 111 at 121 and having a connection with the latch 118 through a slender link 122. By gripping the handle 119 and the upper end of the lever 111 to pivot the handle 119 counterclockwise about the pivot 121, the latch 118 can be raised from either of the notches 116 or 117 to accommodate pivoting of the lever 111. A spring 123 reacting between a clip 124 and the lever 111 urges the latter to pivot counterclockwise.

The linkage interconnecting the lever 111 and the arms 113 and 114 includes a first rod 125 extending telescopically through the upper end of the arm 113 and a second rod 126 pivotally connected with the lower end of the arm 114 and extending telescopically through a section of the arm 113. Rod 125 is adjustable in length by an internally threaded sleeve portion 127 thereof into which threaded portions 128 and 129 of sections 131 and 132 of said rod are turned. Locking nuts 133 and 134 maintain this adjustment. In Fig. 6, the arm 113 can be seen to have furcations 135 between which there is pivotally carried a bearing block 136 upon coaxial trunnion members 137 which are respectively mounted in the furcations 135. Rod 125 is slidable axially within a bearing 138 of the bearing block 136. The operating linkage comprises a first resiliently distortable means in the form of a helical spring 139 mounted upon and about a portion of rod 125 extending forwardly beyond the bearing block 136 of the arm 113. This spring is held under selective tension by a nut 141 and a lock nut 142 therefor on the forward end of the rod 125. The rear end of the spring 139 reacts against the arm 113 through a washer 143 and the bearing block 136. A collar 144 fixed upon the rod 125 is adapted to abut against the end of the bearing block 136 opposite to that against which the spring 139 reacts.

The second rod 126 of the linkage is pivotally connected at 145 to the lower end of the second arm 114 and is telescopically associated with the arm 113 by being slidable within a bearing 146 of a bearing block 147 constructed similarly to the bearing block 136 and similarly mounted between the furcations 135 by trunnion members 148. A second resiliently yieldable element in the form of a spring 149 surrounds a rearward end portion of the rod 126 where it is held captive between the bearing block 147 and a washer 151 adjustably positioned axially of the rod 126 by a nut 152 and a lock nut 153 turned upon a threaded end portion 154 of the rod. A collar 155 is fixed to the rod 126 for abutment against the opposite end of the trunnion member 148 with respect to the spring 149.

Counterclockwise retractive rocking of the arm 114 is selectively limited by limit-providing means in the form of a projection 156 on the tractor body 11 and a set screw 157 turned into a threaded hole 158 on a hub extension 159 of the arm 114. Adjustment of the set screw 157 is maintained by a lock nut 161.

The main clutch CL of the vehicle is conventionally controlled by a foot pedal 162 pivoted at 163 to the tractor body and connected by a fragmentarily shown link 164 with a clutch-operating arm 165.

*Operation of the apparatus*

In explaining the operation of the apparatus, it will be assumed that one of the driving connections has been established through the main change-speed transmission unit 70, as, for example, by sliding the main shaft gear 84 forwardly for meshing it with the tubular countershaft gear 79. It will also be assumed that the main clutch pedal 162 has been released to cause engagement of the main clutch CL, and that the control lever 111 for the plural speed planetary power transmission unit 28 occupies the position illustrated in Figs. 1 and 4. While the lever 111 is in this position, which is designated C, the control linkage rod 125 is moved to its extreme forward range of movement which enables the collar 144 thereon to exert forward force upon the upper end of the arm 113 to retract this arm to its most counterclockwise position attendant to allowing expansion of the brake band 42, Figs. 2 and 9, which is part of the brake or speed control device 40 of the unit 28. This counterclockwise movement of the arm 113 permits forward endwise movement of the rod 126 and clockwise rocking of the arm 114. Such rocking of the arm 114 is urged by the compression springs 55 of the clutch or speed-control device 50 of the planetary gearing unit 28. Thus, by the placing of lever 111 in position C, the speed-control device 40 of the planetary gearing unit is disengaged to terminate establishment of the first or lower speed driving connection between the driving element 29 and the driven element 31 of the planetary gearing unit, and the speed-control device 50 is allowed to be engaged for causing operation of the planetary gearing unit 28 for establishing the second or higher (direct drive) connection between the driving element 29 and the driven element 31 thereof. Consequently, the transmission drive shaft 32 will be caused to rotate in unison with the clutch-driven shaft 27 and with the engine crankshaft 21. Speed reduction with respect to the shaft 32 is attained for the transmission main shaft 73 through the gears 71, 75, 79, and 84. The traction wheel axles 14 will, therefore, be driven at a predetermined speed relatively to the engine crankshaft because of the driving connection from the transmission main shaft 73 through the bevel gear 85a, the differential unit 86, gears 87, and gears 88 with which the axles 14 are constrained for rotation.

The lever 98 at the rear end of the tractor in Fig. 1 is in its rearwardmost position (most clockwise position), thereby permitting engagement of the clutch 95. Consequently, while the vehicle is being driven through the driving connection above described, power will also be transmitted from the gear 91, which is constrained for rotation with the clutch-driven shaft 27, through gear 92, to the power take-off shaft 93, and thence through the clutch 95 to the power take-off tail shaft 96.

A common use for the planetary gearing transmission unit 28 is to shift the tractor vehicle into a lower speed power-transmitting connection between the engine and the traction wheels when the load being pulled by the vehicle increases to exceed the capacity of the engine. This situation arises while plowing when the plow being pulled by the tractor enters an area of abnormally hard earth. When this occurs, the operator of the vehicle will be able to detect a slight deceleration of the governed engine speed and laboring exhaust noise of the engine showing increased load. When this condition is detected, the operator will grasp the lever 111 and quickly pivot the same from position C through position N to position B. In effecting this clockwise rotation of the lever 111, force is transmitted from the rod 125 through the spring 139 to the upper end of the arm 113 and thence from the arm 113 through the spring 149 to rod 126 for rocking the arm 114 counterclockwise. During pivoting of the lever 111 from position C to position N, the arm 114 is rocked far enough to disengage the clutch or speed-control device 50 for the planetary gearing unit 28 and thereby terminate the driving connection through the unit 28 from the shaft 27 to the transmission driving shaft 32. Arm 113 will not yet have been rotated clockwise far enough to cause engagement of the brake band 42, wherefore the speed-control device 40 will not have been actuated for establishing operation of the first speed or lower speed power train through the planetary gearing unit 28. This disruption of power to the driving shaft 32 for the speed transmission 70 can be instantaneous wherefore before the vehicle slows down significantly, the lever 111 will have been moved into position B. Attendant to movement of the lever 111 from position N to position B, force is transmitted from the rod 125 through the spring 139 for rocking the arm 113 from the Fig. 3 position to the Figs. 2, 5, and 7 position. However, before the arm 113 reaches the Fig. 2 position, the brake band 42 of Fig. 8 will have been firmly applied to the brake drum 41 to stop further clockwise movement of the arm 113 during continued clockwise movement of the lever 111 and the departure of the collar 144 on the rod 125 from the trunnion bearing 136 while the rod telescopically slides within this bearing and further compresses the spring 139 to store energy therein capable of taking up the brake band 42 to compensate for wear of its friction lining 47, Fig. 9.

Also attendant to clockwise rocking of the arm 113 from the neutral position N to position B, the trunnion bearing 147 of this lever departs from the collar 155 attendant to compressing the spring 149. This yieldable resilient character of the spring 149 in the operating connection between the arm 113 and the arm 114 facilitates the continued rocking of the arm 113 from the neutral position to the position for engaging the speed-control device 40 without attendant rocking of the arm 114 which is prevented from further clockwise rocking by the motion-limiting device 156—157, Figs. 2 and 5. Further clockwise movement of the arm 114 than permitted by the device 156—157 is unnecessary inasmuch as the shifter fork 61 of the speed-control device 50 will already have been pivoted far enough to have interrupted the power train controlled by this device. By thus limiting the range of swinging motion of the arm 114, and consequently of the shifter fork 61, Fig. 8, the amount of space within the tractor body for accommodating the pivotal shifter fork 61 will be diminished. Now, with the speed-control device 40 constraining the planet gear carrier 34 against rotation, a speed-reduction drive will be established from the sun gear 29 through the cluster gears 36, thence through the cluster gears 38 and the sun gear 31 to the transmission driving shaft 32, enabling the vehicle to be driven at a slower speed and with greater driving force during such time as the inordinate load upon the tractor prevails. When it becomes possible to drive the tractor at a faster speed because of load diminution, the operator can grasp the lever 111 and quickly shift it counterclockwise through the neutral position N to the position C for establishing the driving train involving the speed-control device 50 instead of the speed-control device 40, and thereby create a direct driving connection between the transmission drive shaft 32 and the engine crankshaft.

Another use for the apparatus herein shown is to employ the power take-off through the power take-off tail shaft 96 for driving moving parts of a machine, such as a harvester-thresher towed behind the tractor, and selectively starting or stopping these parts of the towed machine irrespective of whether the traction wheels of the tractor are driven. Irrespective of whether either or neither or the speed-contol devices 40 or 50 is engaged, power will continue to be supplied to the power take-off tail shaft 96 through the gears 91 and 92, power take-off shaft 93 and the friction device 95. Also, it is possible, after having moved the control lever 111 into the neutral position N for disengaging each of the devices 40 and 50, to allow this lever to remain in position N long enough to stop the vehicle and maintain it at rest as long as desired, whereupon the vehicle can be started again, without manipulation of the main clutch CL, by pivoting the lever 111 either into position C or into position B to frictionally and gradually engage the speed-control device 40 or the device 50. Stopping and restarting of the vehicle while the power take-off tail shaft 96 continues to operate is desirable at times when the towed machine encounters an amount of crop exceeding the capacity of the machine. When this condition arises, the operator of the vehicle can simply shift his control lever 111 into the neutral position N, allowing the tractor and the towed machine to cease vehicular movement while power through the power take-off continues operation of the machine parts for clearing it of the material being operated upon. Thus the cleared machine, together with the tractor, can then be caused to resume vehicular movement by re-engagement of either of the speed-control devices 40 or 50.

At other times, it may be desirable to successively discontinue and resume operation of the power take-off tail shaft 96 while the vehicles are in motion. This maneuver is desirable while making short turns in the head lands of fields when a universal joint driving connection between the power take-off tail shaft 96 and a towed machine articulately connected with the tractor may be turned at an angle too acute for the transmission of power therethrough. Therefore, while making the sharp turn at the end of the field, the friction device 95 will be disengaged to stop rotation of the tail shaft 96. After the turn has been executed, the load of the moving parts in the trailing machine can again be taken up gradually by re-engagement of the friction device 95.

Having thus described a limited number of preferred embodiments of the invention with the view of clearly and concisely illustrating the same, we claim:

1. In a control for a vehicle speed-changing unit which comprises respective driving and driven rotatable elements, and speed-control devices individually operable to cause rotation of the driven element at respectively different speeds relatively to the driving element; a first arm in control of a first of said devices and advancively rockable in one direction to operate the first device but biased retractively to terminate such operation; a second arm in control of a second of said devices and biased to rock in one direction attendant to the establishment of operation of such second device but being retractively rockable to terminate operation of the second device; a control lever manually rockable from a second speed position via a neutral position into a first speed position; and an operating linkage comprising a rod pivotally connected to said lever and telescopically associated with the first arm, a second rod pivotally connected with one of said arms and telescopically associated with the other thereof, a spring interposed between the first rod and the first arm and adapted to transmit rocking force from the first rod to the first arm to rock the same advancively insufficiently far to operate the first device attendant to movement of the lever from the second speed position to the neutral position, a second spring interposed between the second rod and the arm telescopically associated therewith for transmitting retractive force to the second arm to rock the same into the retractive position to terminate operation of the second device incident to rocking of the lever into the neutral position, and the first spring being operable to further advancively rock the first arm into position causing operation of the first device incident to rocking of the lever into the first speed position; means precluding further retraction of the second arm during rocking of the lever from neutral into the first speed position, and the second spring being distortable by and to accommodate such rocking of the lever into the first speed position.

2. In a control for a vehicle speed-changing unit which comprises respective driving and driven rotatable elements, and speed-control devices individually operable to cause rotation of the driven element at respectively different speeds relatively to the driving element; a first arm in control of a first of said devices and advancively rockable in one direction to operate the first device but biased retractively to terminate such operation; a second arm in control of a second of said devices and biased to rock in one direction attendant to the establishment of operation of such second device but being retractively rockable to terminate operation of the second device; means providing a limit for the retractive rocking of the second arm; a control lever manually rockable from a second speed position via a neutral position into a first speed position; and an operating linkage comprising a rod pivotally connected with said lever and extending telescopically through the first arm, a second rod pivotally connected with the second arm and extending telescopically through the first arm, first and second collars respectively on said rods, first and second springs respectively upon said rods at the opposite sides of said arms with respect to their associated collars and reacting between the arms and their rods to urge the rods telescopically therein for abutting the collars against such arms, the first spring being operable to transmit operating force to the first arm for advancively rocking the same insufficiently far to cause operation of the first device attendant to pivoting of the lever from the second speed position to the neutral position and the second spring being operable during such advancive rocking of the first arm to transmit tensile force through the second rod to the second arm for retractively rocking the same to terminate operation of the second speed device, the second spring being further compressible attendant to further advancive rocking of the first arm into position for establishing operation of the first device while the second arm is held against further retractive rocking by said limit-providing means, and the first spring device being operable to effect such further rocking of the first arm attendant to pivoting of the lever from the neutral position to the first speed position.

References Cited in the file of this patent
UNITED STATES PATENTS

| | | |
|---|---|---|
| 814,502 | Anderson | Mar. 6, 1906 |
| 1,389,692 | Pennington | Sept. 6, 1921 |
| 1,553,319 | Lardner | Sept. 15, 1925 |
| 1,733,936 | Boughton | Oct. 29, 1929 |